United States Patent [19]

Takeyasu et al.

[11] Patent Number: 5,093,380
[45] Date of Patent: Mar. 3, 1992

[54] POLYURETHANE FLEXIBLE FOAM AND METHOD FOR ITS PRODUCTION

[75] Inventors: Hiromitsu Takeyasu, Tokyo; Tsunehisa Sonobe, Yokohama; Yoshiyuki Yamaguchi, Yokohama; Takao Doi, Yokohama, all of Japan

[73] Assignee: Asahi Glass Company, Ltd., Tokyo, Japan

[21] Appl. No.: 499,346

[22] PCT Filed: Oct. 18, 1989

[86] PCT No.: PCT/JP89/01067
§ 371 Date: Aug. 15, 1990
§ 102(e) Date: Aug. 15, 1990

[87] PCT Pub. No.: WO90/04613
PCT Pub. Date: May 3, 1990

[30] Foreign Application Priority Data

Oct. 25, 1988 [JP] Japan .................. 63-267297
Feb. 10, 1989 [JP] Japan .................. 1-29644

[51] Int. Cl.[5] .............................. C08G 18/14
[52] U.S. Cl. ................... 521/131; 521/160; 521/174; 521/176
[58] Field of Search ........... 521/131, 160, 174, 176

[56] References Cited

U.S. PATENT DOCUMENTS 3,829,505 8/1974 Herold .................. 260/611
4,326,047 4/1982 Yates ..................... 525/507
4,687,851 8/1987 Laughner ............... 544/398

FOREIGN PATENT DOCUMENTS 0149795 7/1985 European Pat. Off. .

Primary Examiner—Maurice J. Welsh
Attorney, Agent, or Firm—Oblon, Spivak, McClelland, Maier & Neustadt

[57] ABSTRACT

The present invention relates to a polyurethane flexible foam having a resonant frequency of not higher than 3.5 Hz and a method for producing such a polyurethane flexible foam.

The polyurethane flexible foam of the present invention is obtained by using at least one member selected from a specific polyoxyalkylene polyol and a polymer-dispersed polyol containing said polyoxyalkylene polyol as the matrix and a polyisocyanate compound as the main reactive materials, and it is a polyurethane flexible foam having a resonant frequency of not higher than 3.5 Hz.

Such a polyurethane flexible foam is obtained by using a polyoxyalkylene polyol with both the hydroxyl value (X mgKOH/g) and the total unsaturation degree (Y meq/g) being particularly low, or a polymer-dispersed polyol containing such a polyoxyalkylene polyol as the matrix. Namely, it is obtained by using as the above polyoxyalkylene polyol, a polyoxyalkylene polyol having a hydroxyl value (X mg/KOH/g) of from 5 to 38 and a total unsaturation degree (Y meq/g) of not more than 0.07, and both being in the following relation:

$$Y \leq 0.9/(X-10)$$

As such a polyoxyalkylene polyol, a polyoxyalkylene polyol having an oxypropylene group content of at least 70% by weight and an oxyethylene group content of at least 5% by weight, is preferred.

Further, it is preferred to use a small amount of a cross-linking agent together with the above polyoxyalkylene polyol.

The polyurethane flexible foam of the present invention has a vibration characteristic suitable for seat cushions for automobiles. Accordingly, a comfortable ride in an automobile can be improved by using the polyurethane flexible foam of the present invention for a seat cushion of the automobile.

23 Claims, No Drawings

POLYURETHANE FLEXIBLE FOAM AND METHOD FOR ITS PRODUCTION

DESCRIPTION

1. TECHNICAL FIELD

The present invention relates to a polyurethane flexible foam and a method for its production. Particularly, it relates to a polyurethane flexible foam having excellent physical properties as a seat cushion for automobiles, and a method for its production.

2. BACKGROUND TECHNIQUE

In recent years, various new studies have been made to improve the properties of polyurethane flexible foam. For example, reflecting a trend for grading up of e.g. automobiles, improvement of the vibration characteristics of seat cushions, is desired. The relation between the vibration of the car body and the human being is not uniform. However, it is suggested that it is effective for the improvement of the comfortable ride to take a particularly large attenuation of the frequency region (e.g. from 4 to 8 Hz or from 6 to 20 Hz) to which human being is particularly sensitive. Accordingly, it is considered possible to substantially improve the comfortable ride if the seat cushion is made of a polyurethane flexible foam having a resonant frequency lower than this frequency region. However, heretofore, no polyurethane flexible foam has been known which has a resonant frequency of less than 4 Hz.

SUMMARY OF THE INVENTION

The present invention provides a polyurethane flexible foam having a resonant frequency of less than 4 Hz. Further, the present invention provides a method for producing a polyurethane flexible foam, whereby such a polyurethane flexible foam can be produced. The polyurethane flexible foam of the present invention can be obtained by using a polyoxyalkylene polyol having a particularly low hydroxyl value and a low total unsaturation degree. Namely, it can be obtained by using as the polyoxyalkylene polyol a high molecular weight polyol which is a polyoxyalkylene polyol containing oxyalkylene groups of at least 3 carbon atoms as the main component, particularly a polyoxyalkylene polyol having at least 70% by weight of oxypropylene groups derived from 1,2-propyleneoxide and wherein the hydroxyl value ($X$ mgKOH/g) and the total unsaturation degree ($Y$ meq/g) are in the relation of the following formula (1), and $Y \leq 0.07$ and $X$ is from 5 to 38:

$$Y \leq 0.9/(X-10) \tag{10}$$

The average number of hydroxyl groups per molecule of this polyoxyalkylene polyol is preferably from 2 to 8, more preferably from 2 to 6. Further, a polymer-dispersed polyol having this polyoxyalkylene polyol as the matrix and a mixture of such a polymer-dispersed polyol and this polyoxyalkylene polyol, are also preferred polyols.

Further, it is also preferred to use a polyfunctional compound having a relatively low molecular weight which is called a crosslinking agent, together with the above polyoxyalkylene polyol. It is essential to use a polyisocyanate compound as a starting material for the polyurethane flexible foam. Further, a catalyst, a foaming agent and a foam stabilizer are usually essential assisting agents. Thus, the polyurethane flexible foam of the present invention is produced by using these materials as the starting materials.

For the polyurethane flexible foam of the present invention, it is essential that its resonant frequency is less than 4 Hz, particularly not higher than 3.5 Hz. In addition, the impact resiliency of the core is preferably at least 70%, and further, the wet heat permanent strain is preferably not higher than 10%.

Now, each starting material component in the present invention will be described.

Polyoxyalkylene polyol

The polyoxyalkylene polyol used as a starting material for polyurethane, is usually produced by ring-opening addition polymerization of an alkylene oxide such as propylene oxide to an initiator such as a polyhydric alcohol by means of an alkali catalyst such as an alkali metal hydroxide. In such a process, a monool having an unsaturated group is formed as a byproduct, and the production rate of this unsaturated monool increases with an increase of the molecular weight of the polyol (with a decrease of the hydroxyl value). The presence of this unsaturated monool is not in such a serious amount in the case of a polyoxyalkylene polyol having a hydroxyl value of about 56 which is widely used as a starting material for polyurethane flexible foam. However, in a polyoxyalkylene polyol having a low hydroxyl value which is used as a starting material for e.g. polyurethane elastomer, the presence of this unsaturated monool is likely to create a problem. For example, with a polyoxyalkylene polyol having a hydroxyl value of about 34, the total unsaturation degree usually becomes at least 0.1 meq/g. Further, it has been practically impossible to prepare a polyoxyalkylene polyol having a still lower hydroxyl value by means of an alkali catalyst, since its total unsaturation degree becomes remarkably high.

Further, even if an flexible foam is produced by using a polyoxyalkylene polyol having a high total unsaturation degree, there will be problems such as a decrease in the hardness, a decrease in the impact resiliency, a deterioration in the compression permanent strain, a deterioration in the curability at the time of molding the foam, etc.

The polyoxyalkylene polyol used in the present invention has a low unsaturation degree as compared with a starting material commonly employed for polyurethane flexible foam, whereby the conventional problems, particularly the problems observed in the case of employing a high molecular weight polyoxyalkylene polyol having a hydroxyl value of not higher than 38 (a decrease in the hardness, a decrease in the impact resiliency, a deterioration in the compression permanent strain and a deterioration in the curability at the time of molding the foam) can be controlled, and it is excellent in the vibration attenuation properties.

Such a polyoxyalkylene polyol can usually be obtained by using a catalyst other than an alkali catalyst, for example, by using zinc diethyl, iron chloride, metal porphyrin or a double metal cyanide complex, as the catalyst. A particularly excellent polyoxyalkylene polyol is obtainable by the use of a double metal cyanide complex. Methods for producing such a polyoxyalkylene polyol are disclosed, for example, in the following documents:

U.S. Pat. No. 3,829,505, U.S. Pat. No. 3,941,849, U.S. Pat. No. 4,355,188,

U.S. Pat. No. 3,427,334, U.S. Pat. No. 3,427,335, U.S. Pat. No. 4,472,560,

U.S. Pat. No. 4,477,589, EP 283,148

In the present invention, as the polyol, at least one member of the above-mentioned polyoxyalkylene polyols having a low unsaturation degree and low hydroxyl value, may be employed. Further, in addition to the polyoxyalkylene polyol, a polyol having from 2 to 8, particularly from 2 to 4 hydroxyl groups, such as a polyester-type polyol, a hydroxyl group-containing polydiene-type polymer or a polycarbonate-type polyol, may optionally incorporated, as the case requires. It is particularly preferred to use at least one polyoxyalkylene polyol or a polymer-dispersed polyol containing such a polyoxyalkylene polyol as the matrix, or to use it as the main component in combination with a small amount (usually not more than 30% by weight) of a polyester-type or a hydroxyl group-containing polydiene-type polymer.

As the polyoxyalkylene polyol in the present invention, polyhydric alcohols, saccharides, alkanolamines, polyhydric phenols, polyoxyalkylene polyols obtained by adding alkylene oxides thereto and having molecular weights lower than the desired products, or polyoxyalkylene polyols obtained by adding at least one type of monoepoxide to other initiators, may be used. As the monoepoxide, it is preferred to use 1,2-propylene oxide, 1,2-butylene oxide, 2,3-butylene oxide, styrene oxide, at least one of other alkylene oxides having at least 3 carbon atoms, and a combination of at least one of them with ethylene oxide. Particularly preferred is at least one of 1,2-propylene oxide, 1,2-butylene oxide and 2,3-butylene oxide, or a combination of at least one of them with ethylene oxide. Most preferred is a polyoxyalkylene polyol containing at least 70% by weight, particularly at least 80% by weight, of oxypropylene groups derived from 1,2-propylene oxide.

As the above polyoxyalkylene polyol, a polyoxyalkylene polyol having a high primary hydroxyl value is preferred. Such a polyoxyalkylene polyol has oxyethylene groups or polyoxyethylene block chains at its molecular terminals. The proportion of such oxyethylene groups present at the terminal portions is preferably at least 2% by weight, more preferably from 5 to 30% by weight, most preferably from 5 to 20% by weight.

The polyoxyalkylene polyol in the present invention may be a mixture of two or more different types. However, it is preferred that it does not substantially contain a polyoxyalkylene polyol with a hydroxyl value exceeding 38. In such a case, the hydroxyl value, the number of hydroxyl groups and the total unsaturation degree are represented by average values. In the present invention, the polyoxyalkylene polyol has the upper limit of Y being 0.07 when X is not higher than about 22.9. More preferably, the upper limit of Y is 0.04 (when X is from about 32.5 to 38, the formula (1) will apply). Further, the hydroxyl value is more preferably from 5 to 28.

Polymer-dispersed polyol

As the polyol of the present invention, a polymer-dispersed polyol can be employed. The polyol as the matrix for the polymer-dispersed polyol is required to be the above-mentioned polyoxyalkylene polyol. The polymer-dispersed polyol is a dispersion having fine polymer particles dispersed stably in this matrix. As the polymer, an addition polymerization polymer or a condensation polymerization polymer may be mentioned.

A polymer-dispersed polyol wherein the matrix is a conventional polyol, is known and is widely used a polyol for polyurethane flexible foam. The polymer-dispersed polyol in the present invention can be produced by a conventional method using the above polyoxyalkylene polyol as the matrix. Further, a relatively small amount of a conventional polymer-dispersed polyol may be added to the above polyoxyalkylene polyol. In such a case, a polyol constituting the matrix of the conventional polymer-dispersed polyol will be added in a small amount to the above polyoxyalkylene polyol. Even in such a case, the relation of the hydroxyl value and the total unsaturation degree of the above polyoxyalkylene polyol is required to be satisfied as an average. Thus, the polyoxyalkylene polyol constituting the matrix for the polymer-dispersed polyol in the present invention, is required to satisfy the above requirements (e.g. the relation of the hydroxyl value and the total unsaturation degree).

The fine polymer particles in the polymer-dispersed polyol are made of an addition polymerization type polymer such as a homopolymer or copolymer of acrylonitrile, styrene, methacrylate, an alkyl methacrylate, an alkyl acrylate or other vinyl monomer, or a condensation polymerization type polymer such as a polyester, polyurea, polyurethane or a melamine resin. By the presence of such fine polymer particles, the hydroxyl value of the entire polymer-dispersed polyol will usually be lower than the hydroxyl value of the polyol as the matrix. Accordingly, the hydroxyl value of the entire polymer-dispersed polyol having the above polyoxyalkylene polyol as the matrix, is preferably from 5 to 38, more preferably from 5 to 28.

The content of the fine polymer particles in the polymer-dispersed polyol or in a mixture of such a polymer-dispersed polyol and the above polyoxyalkylene polyol, is usually not higher than 60% by weight, preferably not higher than 40% by weight. The amount of the fine polymer particles is not required to be large. On the other hand, even if the amount is excessive, there is no particular disadvantage other than the economical disadvantage. In most cases, they are sufficiently effective in an amount of not higher than 20% by weight. The presence of fine polymer particles in the polyoxyalkylene polyol is not essential. However, the presence is effective for the improvement of the hardness, the air permeability and other physical properties of the foam. Accordingly, the fine polymer particles are preferably present in an amount of at least 0.1% by weight, more preferably at least 1% by weight, most preferably at least 2% by weight.

Crosslinking agent

In the present invention, it is possible to react only the above polyoxyalkylene polyol having a low hydroxyl value (i.e. a high molecular weight) (provided that water is excluded) with the isocyanate compound. However, a low molecular weight polyfunctional compound reactive with an isocyanate group (which is called a crosslinking agent in the present invention) can be used together with the high molecular weight polyoxyalkylene polyol. This polyfunctional compound is preferably a compound having at least two isocyanate-reactive groups such as hydroxyl groups, primary amino groups or secondary amino groups and having a molecular weight of not higher than 600, particularly not higher than 300, per isocyanate-reactive group. Such a crosslinking agent includes a compound which is usually called a crosslinking agent or a chain extender in the polyurethane technical field. Such a compound includes, for example, polyhydric alcohols, alkanolamines, polyamines, and low molecular weight polyoxyalkylene polyol type polyols obtained by adding small amounts of alkylene oxides to polyhydric alcohols, akanolamines, saccharides, polyamines, monoamines or polyhydric phenols. Further, low molecular weight polyester type polyols or polyamines may also be employed. Preferably, polyhydric alcohols such as ethylene glycol, propylene glycol, 1,4-butanediol and glycerol, alkanolamines such as diethanolamine and triethanolamine, polyoxyalkylene type polyols having a hydroxyl value of at least 200, and polyamines such as t-butyltolylenediamine, diethyltolylenediamine and chlorodiaminobenzene, are employed. Particularly preferred are polyoxyalkylene type polyols having a hydroxyl value of at least 200 and from 3 to 8 hydroxyl groups. Such a polyfunctional compound is used preferably in an amount of not higher than about 10 parts by weight, particularly not higher than 5 parts by weight, per 100 parts by weight of the high molecular weight polyol. There is no particular restriction as to the lower limit of the amount. However, in its use, adequate effectiveness is obtainable with an amount of about 0.2 part by weight.

Polyisocyanate compound

The polyisocyanate compound may be an aromatic, alicyclic or aliphatic polyisocyanate having at least two isocyanate groups, a mixture of at least two such polyisocyanates, as well as modified polyisocyanates obtained by modifying them. Specifically, there may be mentioned, for example, polyisocyanates such as tolylene diisocyanate (TDI), diphenylmethane diisocyanate (MDI), polymethylenepolyphenyl isocyanate (so called crude MDI), xylylene diisocyanate (XDI), isophorone diisocyanate (IPDI) and hexamethylene diisocyanate (HMDI), and their prepolymer type modified products, nulate modified products, urea modified products and carbodiimide modified products. Preferably, at least one aromatic polyisocyanate selected from TDI, MDI, crude MDI and their modified products, is employed. More preferably, a mixture comprising at least one of MDI, crude MDI and their modified products and TDI or its modified products, is employed. The amount of TDI is preferably from 50 to 100% by weight.

The isocyanate group content in the polyisocyanate compound in the present invention is preferably at least 15% by weight, particularly preferably at least 20% by weight.

Other starting material components

For the reaction of the polyol and the polyisocyanate compound, it is usually required to employ a catalyst. As the catalyst, a metal compound catalyst such as an organotin compound for accelerating the reaction of the active hydrogen-containing group with the isocyanate group, or a tertiary amine catalyst such as triethylenediamine, may be used. Further, a polymerization catalyst for reacting isocyanate groups to one another, such as a metal salt of a carboxylic acid, may be used as the case requires. Further, in many cases, a foam stabilizer for forming good foam, is used. As the foam stabilizer, a foam stabilizer of silicone type or a foam stabilizer of fluorine-containing compound type may, for example, be mentioned. Other optional additives include, for example, a filler such as silica, alumina or calcium carbonate, an antioxidant, an ultraviolet absorber, a stabilizer such as a photostabilizer, a colorant and a flame retardant. As mentioned above, in the present invention, as the foaming agent, a water-type foaming agent, a halogenated hydrocarbon such as R-11 (trichlorofluoromethane), R-12 (difluorodichloromethane), R-123 (1,1-dichloro-2,2,2-trifluoroethane), R-12B$_2$ (difluorodibromomethane), R-141b (1,1-dichloro-1-fluoroethane) or methylene chloride, butane, hexane, air or nitrogen, may be employed. The water-type foaming agent may be water itself or a compound capable of generating water at the time of the reaction, such as a hydrate. A low boiling point halogenated hydrocarbon may be used as a foaming agent in combination with the water-type foaming agent.

In a case where a water type foaming agent is employed as the foaming agent, a part of the above polyisocyanate compound reacts with water to generate carbon dioxide gas. Accordingly, the amount of the polyisocyanate compound used is calculated on the basis of the sum obtained by adding the water-type foaming agent to the total of the high molecular weight polyol and the low molecular weight polyfunctional compound, and it is preferred to use the polyisocyanate compound in an amount of from 0.8 to 1.3 equivalent relative to 1 equivalent of the sum. 100 Times of the equivalent of this polyisocyanate compound is usually called (isocyanate) index. Accordingly, the index of the polyisocyanate compound is preferably from 80 to 130.

EXAMPLES

The following polyoxyalkylene polyols were used as starting materials for polyurethane flexible foams described hereinafter. Each polyol was prepared by adding propylene oxide to an initiator of polyoxypropylene polyol having a molecular weight of from 400 to 600 by means of a zinc hexacyanocobaltate complex as a catalyst, then deactivating the catalyst, and adding ethylene oxide by means of an alkali catalyst, followed by purification to remove the catalyst component. In Table 1, the names of the obtained polyoxyalkylene polyols, and the numbers of hydroxyl groups (N), the hydroxyl values (X), the oxyethylene contents (EO) and the total unsaturation degrees (Y) of the polyoxyalkylene polyols, are shown.

The polyols used for the purpose of comparison (polyols J, K, and L) are polyoxyalkylene polyols prepared by reacting propylene oxide to an initiator (glycerol) by means of an alkali catalyst, and then reacting ethylene oxide thereto, followed by purification.

TABLE 1

| Name | N | EO (wt %) | X (mg KOH/g) | Y (meq/g) |
|---|---|---|---|---|
| Polyol A | 3 | 15 | 24 | 0.020 |
| Polyol B | 3 | 10 | 10 | 0.025 |
| Polyol C | 4 | 10 | 10 | 0.025 |
| Polyol D | 3 | 12 | 17 | 0.023 |
| Polyol E | 3 | 12 | 11 | 0.026 |
| Polyol F | 3 | 10 | 14 | 0.025 |
| Polyol G | 3 | 15 | 28 | 0.020 |
| Polyol H | 3 | 15 | 32 | 0.018 |
| Polyol I | 4 | 17 | 28 | 0.020 |
| Polyol J | 3 | 15 | 28 | 0.10 |
| Polyol K | 3 | 15 | 32 | 0.15 |
| Polyol L | 3 | 15 | 34 | 0.102 |

Polymer-dispersed polyols:

Polymer-dispersed polyols containing the above polyoxyalkylene polyols as matrix and containing 20% by weight of fine particles of polyacrylonitrile, were used. The names of such polymer-dispersed polyols are represented by adding p to the names of the respective polyols (example: polyol Ap).

Other materials used for the preparation of polyurethane flexible foams are as follows.

Crosslinking agent:
A: A sorbitol-propylene oxide-ethylene oxide adduct. Hydroxyl value: 450 (molecular weight of about 125 per hydroxyl group)
B: Diethanolamine Catalysts:
A: Triethylenediamine solution ("Dabco 33LV" tradename)
B: N ethylmorpholine
C: Stannous octoate
D: Tertiary amine catalyst ("Kaolizer No. 1" tradename, sold by Kao Corporation)
Foaming agent:
A: Water
B: 1,1-Dichloro-2,2,2-trifluoroethane (R-123)
C: 1,1-Dichloro-1-fluoroethane (R-141b)
Foam stabilizer:
A: Silicone type foam stabilizer ("L 5750S" tradename, sold by Nippon Unika K.K.)
B: Silicone type foam stabilizer ("L-5309" tradename, sold by Nippon Unika K.K.)
C: Silicone type foam stabilizer ("SF-2962" tradename, sold by Toray Silicone K.K.)
D: Silicone type foam stabilizer ("SRX-274C" tradename, sold by Toray Silicone K.K.)
Polyisocyanate compounds:
A: TDI-80
B: Mixture of TDI-80 and crude MDI ("MR-200" tradename, sold by Nippon Polyurethane K.K.) in a weight ratio of 80/20.
C: Modified MD2 for polyurethane flexible foam (NCO content: 27%)

EXAMPLES 1 to 17

Using the starting materials as identified in Table 2, polyurethane flexible foams were prepared.

The polyisocyanate compound was added to a mixture of all the starting materials except for the polyisocyanate compound, followed by stirring. The mixture was immediately injected into a mold of 350 mm x 350 mm and 100 mm in height heated to 60° C. or 40° C. (No. 1 and No. 17), and the mold was closed and left at room temperature for 5 minutes. Then, the molded polyurethane flexible foam was taken out from the mold. Then, the following physical properties of the foam were measured. The types of the starting materials, the amounts (represented by parts by weight, provided that the amount of the polyisocyanate compound used was represented by the isocyanate index (100 times of the equivalent ratio)), and the physical properties of the foam are shown in Table 2. The physical properties were measured by the following methods.

Appearance: Visually evaluated
Air flow: ASTM D1564
25% ILD: JIS K6401
Impact resilience: JIS K6401
Elongation: JIS K6401
Wet heat permanent strain: JIS K6401
Resonant frequency: JASO B407-82
6 Hz transmittance: JASO B407-82

TABLE 2

|  |  | 1 | 2 | 3 | 4 | 5 | 6 | 7 | 8 | 9 |
|---|---|---|---|---|---|---|---|---|---|---|
| Composition of starting material | Polyol (amount) | A (100) | B (100) | C (100) | A (70) Ap (30) | D (70) Dp (30) | E (70) Ep (30) | C (70) Cp (30) | A (70) Ap (30) | E (70) Ep (30) |
|  | Crosslinking agent (amount) |  | A (3.0) | B (1.0) | A (3.0) | A (3.0) | A (3.0) | A (3.0) | A (3.0) | A (3.0) |
|  | Catalyst (amount) | A (0.3) B (0.3) C (0.2) | A (0.6) D (0.5) | A (0.6) D (0.5) | A (0.7) | A (0.7) | A (0.7) | A (0.7) | A (0.7) | A (0.7) |
|  | Foaming agent (amount) | A (3.5) | A (3.5) | A (3.7) | A (3.0) | A (3.0) | A (3.0) | A (3.0) | A (3.0) B (3.0) | A (2.8) B (5.0) |
|  | Foam stabilizer (amount) | A (2.0) | C (1.5) | C (1.0) | D (1.0) | D (1.0) | D (1.0) | D (1.0) | D (1.0) | D (1.0) |
|  | Polyisocyanate [Index] | A [100] | A [105] | C [105] | B [105] | B [105] | B [105] | B [105] | B [105] | B [105] |
| Physical properties | Appearance | Good | Good | Good | Good | Good | Good | Good | Good | Good |
|  | Core density (kg/m$^3$) | 41.0 | 38.0 | 49.9 | 47.6 | 47.9 | 48.2 | 47.2 | 47.3 | 47.0 |
|  | Air flow (cfm) | — | — | — | 2.3 | 2.9 | 3.3 | 1.8 | 3.6 | 2.8 |
|  | 25% ILD (kg/314 cm$^2$) | 18.7 | 15.8 | 23.6 | 22.7 | 21.8 | 20.0 | 21.7 | 23.3 | 20.0 |
|  | Impact resiliency (core) (%) | 74 | 80 | 79 | 80 | 84 | 87 | 80 | 78 | 85 |
|  | Elongation (%) | 205 | 165 | 125 | 149 | 155 | 165 | 139 | 130 | 153 |
|  | Wet heat compression permanent strain (%) | 9.9 | 9.7 | 3.5 | 5.0 | 4.7 | 4.3 | 7.0 | 8.4 | 5.3 |
|  | Resonant frequency (Hz) | 3.4 | 3.2 | 3.1 | 3.0 | 2.8 | 2.7 | 3.1 | 3.0 | 3.0 |
|  | 6 Hz transmittance | 0.50 | 0.40 | 0.38 | 0.35 | 0.30 | 0.20 | 0.40 | 0.35 | 0.37 |

|  |  | 10 | 11 | 12 | 13 | 14 | 15 | 16 | 15 |
|---|---|---|---|---|---|---|---|---|---|
| Composition of starting material | Polyol (amount) | E (70) Ep (30) | F (70) Fp (30) | G (70) Gp (30) | H (70) Hp (30) | I (70) Ip (30) | K (70) Kp (30) | K (70) Kp (30) | L (100) |
|  | Crosslinking agent (amount) | A (3.0) | A (3.0) | A (3.0) | A (3.0) | A (3.0) | A (3.0) | A (3.0) |  |
|  | Catalyst (amount) | A (0.7) | A (0.7) | A (0.6) | A (0.6) | A (0.6) | A (0.7) | A (0.7) | A (0.3) B (0.3) C (0.2) |
|  | Foaming agent (amount) | A (3.0) C (3.0) | A (3.0) B (3.0) | A (3.3) | A (3.3) | A (3.3) | A (3.3) B (3.0) | A (3.3) B (3.0) | A (4.0) |
|  | Foam stabilizer (amount) | D (1.0) | D (1.0) | D (1.0) | D (1.0) | D (1.0) | D (1.0) | D (1.0) | A (2.0) |
|  | Polyisocyanate [Index] | B [105] | A [105] | B [105] | B [105] | A [105] | B [105] | A [100] | A [100] |

TABLE 2-continued

| Physical properties | Appearance | Good | Good | Good | Good | Good | Cure defect Foam partially destroyed | Cure defect Foam partially destroyed | Good |
|---|---|---|---|---|---|---|---|---|---|
| | Core density (kg/m$^3$) | 51.3 | 46.9 | 48.3 | 47.9 | 48.2 | 47.1 | 48.0 | 36.0 |
| | Air flow (cfm) | 2.4 | 3.5 | 3.0 | 2.4 | 3.3 | 3.5 | 3.3 | — |
| | 25% ILD (kg/314 cm$^2$) | 23.3 | 22.0 | 23.5 | 26.1 | 26.6 | 21.0 | 21.5 | 15.7 |
| | Impact resiliency (core) (%) | 75 | 83 | 73 | 71 | 74 | 62 | 63 | 48 |
| | Elongation (%) | 163 | 150 | 141 | 132 | 140 | 90 | 110 | 145 |
| | Wet heat compression permanent strain (%) | 5.0 | 5.7 | 5.9 | 6.4 | 5.0 | 15.2 | 24.3 | 25 |
| | Resonant frequency (Hz) | 2.8 | 2.8 | 3.2 | 3.4 | 3.3 | 4.0 | 4.3 | 4.3 |
| | 6 Hz transmittance | 0.30 | 0.30 | 0.45 | 0.50 | 0.45 | 0.70 | 0.68 | 0.67 |

We claim:

1. A method for producing a polyurethane flexible foam, which comprises reacting at least one high molecular weight polyol selected from the group consisting of the following polyoxyalkylene polyol and a polymer-dispersed polyol containing the following polyoxyalkylene polyol as the matrix, an optional crosslinking agent and a polyisocyanate compound in the presence of assisting agents selected from the group consisting of a catlyst, a foaming agent and a foam stabilizer or a mixture thereof:

Polyoxyalkylene polyol: A polyoxyalkylene polyol with the hydroxy value (X mgKOH/g) and the total unsaturation degree (Y meq/g) being in the following relation, with Y being not more than 0.07, the hydroxyl value (X) being from 5 to 38 and the number of hydroxyl groups being from 2 to 8:

$Y \leq 0.9/(X-10)$

2. The method according to claim 1, wherein the polyoxyalkylene polyol has a hydroxyl value (X) of from 5 to 28 and a total unsaturation degree (Y) of not more than 0.04.

3. The method according to claim 1, wherein the polyoxyalkylene polyol is a polyoxyalkylene polyol having an oxypropylene group content of at least 70% by weight and optionally containing oxyethylene groups.

4. The method according to claim 3, wherein the polyoxyalkylene polyol is a polyoxyalkylene polyol containing at least 5% by weight of terminal oxyethylene groups.

5. The method according to claim 1, wherein the polymer-dispersed polyol contains from 1 to 40% by weight of fine polymer particles.

6. The method according to claim 5, wherein the fine polymer particles are fine particles of a vinyl polymer.

7. The method according to claim 1, wherein the crosslinking agent is used in an amount of from 0.2 to 10 parts by weight per 100 parts by weight of the polyol.

8. The method according to claim 1, wherein the crosslinking agent is a polyol having a molecular weight of not higher than 600 per hydroxyl group and having from 2 to 8 hydroxyl groups.

9. The method according to claim 1, wherein the polyisocyanate compound is an aromatic polyisocyanate.

10. The method according to claim 9, wherein the aromatic polyisocyanate is at least one member selected from the group consisting of tolylene diisocyanate, diphenylmethane diisocyanate, crude diphenylmethane diisocyanate and at least one modified product thereof.

11. The method according to claim 10, wherein the aromatic polyisocyanate is a mixture comprising at least one member selected from the group consisting of tolylene isocyanate and modified products thereof and at least one member selected from the group consisting of diphenylmethane diisocyanate, crude diphenylmethane diisocyanate and modified products thereof.

12. The method according to claim 1, wherein the foaming agent is water, or water and a low boiling point halogenated hydrocarbon.

13. A method for producing a polyurethane flexible foam, which comprises reacting a polymer-dispersed polyol wherein the matrix is the following polyoxyalkylene polyol and fine polymer particles are dispersed stably in the matrix, from 0.2 to 10 parts by weight, per 100 parts by weight of the polymer-dispersed polyol, of a crosslinking agent and an aromatic polyisocyanate in an amount of from 0.8 to 1.3 equivalent per equivalent of the total amount of the polymer-dispersed polyol, the crosslinking agent and water when a foaming agent contains water, in the presence of a catalyst, a foaming agent and a foam stabilizer:

Polyoxyalkylene polyol: A polyoxyalkylene polyol having an oxypropylene group content of at least 70% by weight, a terminal oxyethylene group content of at least 5% by weight, a number of hydroxyl groups of from 2 to 8, a hydroxyl value (X mgKOH/g) of from 5 to 38 and a total unsaturation degree (Y meq/g) of not more than 0.07, with X and Y being in the following relation:

$Y \leq 0./9/(X-10)$.

14. The method according to claim 13, wherein the polymer-dispersed polyol contains from 1 to 40% by weight of fine polymer particles.

15. The method according to claim 14, wherein the fine polymer particles are fine particles of a vinyl polymer.

16. The method according to claim 13, wherein the polyoxyalkylene polyol has a hydroxyl value of from 5 to 28 and a total unsaturation degree of not more than 0.04.

17. The method according to claim 13, wherein the crosslinking agent is a polyoxyalkylene polyol having a molecular weight of not higher than 300 per hydroxyl group and a number of hydroxyl groups of from 3 to 8.

18. A polyurethane flexible foam obtained by using at least one polyol selected from a polyoxyalkylene polyol having an oxypropylene group content of at least 70% by weight and a polymer-dispersed polyol containing said polyoxyalkylene polyol as the matrix and a polyisocyanate compound as the main reactive materials, and having a resonant frequency of not higher than 3.5 Hz.

19. The polyurethane flexible foam according to claim 18, wherein the impact resilience of the core is at least 70%.

20. A polyurethane flexible foam obtained by the method according to claim 1.

21. The polyurethane flexible foam according to claim 20, wherein the resonant frequency is not higher than 3.5 Hz.

22. A polyurethane flexible foam obtained by the method according to claim 13.

23. The polyurethane flexible foam according to claim 22, wherein the resonant frequency is not higher than 3.5 Hz.

* * * * *